United States Patent [19]

Riggle et al.

[11] 4,363,056

[45] Dec. 7, 1982

[54] DISK HOUSING FOR DISK DRIVE MASS STORAGE UNIT

[75] Inventors: Charles M. Riggle, Acton, Mass.; Christopher A. Pollard; John D. Read, both of Monument, Colo.

[73] Assignee: Digital Equipment Corporation, Maynard, Mass.

[21] Appl. No.: 126,024

[22] Filed: Feb. 29, 1980

[51] Int. Cl.³ .............................................. G11B 5/012
[52] U.S. Cl. ..................................................... 360/98
[58] Field of Search .................... 360/97, 98, 99, 129, 360/137; 308/36.1; 358/128

[56] References Cited

U.S. PATENT DOCUMENTS

| | | | |
|---|---|---|---|
| 3,973,273 | 8/1976 | Lissner | 360/98 |
| 4,008,492 | 2/1977 | Elsing | 360/98 |
| 4,068,851 | 1/1978 | Yamamura | 358/128 |
| 4,190,870 | 2/1980 | Avina et al. | 360/98 |
| 4,191,981 | 3/1980 | Van Winkle | 360/98 |

*Primary Examiner*—Robert M. Kilgore
*Attorney, Agent, or Firm*—Cesari & McKenna

[57] ABSTRACT

A housing (1-10) for a disk (1-12) used in a "Winchester"-type disk mass information storage unit in a data processing system. The housing is symmetrical about the plane of the disk, and supports the disk spindle (2-33) on both sides of the disk. The housing includes two substantially identical members (1-16, 17) fitted together in a clamshell-type arrangement. The housing includes a housing extension (1-26) for receiving and supporting the read/write heads (1-14) and actuator (1-15) therefor from both ends thereof. The members forming the housing are preferably thin walled castings, and may include fins (1-104) to dissipate heat or to enhance the housing's mechanical rigidity.

5 Claims, 7 Drawing Figures

DISK HOUSING FOR DISK DRIVE MASS STORAGE UNIT

BACKGROUND OF THE INVENTION

1. Field of the Invention

This invention relates generally to the field of disk drives for mass information storage units for use in data processing systems, and more particularly to a new and improved housing for disks used in such drives.

2. Description of the Prior Art

Data processing systems typically include one or more mass data storage units in which data can be written on or retrieved from a magnetic medium. In modern data storage units, the magnetic medium typically may be deposited on and supported by an annular substrate such as aluminum. This disk is mounted in a drive in which it is rapidly rotated about its axis. The drive includes read/write heads which can be moved across the disk surface by an actuator in the drive to permit any one of a series of concentric annular data tracks to be accessed, the tracks being disposed on the substrate at differing radii. A drive may contain either a single disk or several disks stacked in spaced apart relation on a common spindle.

It has been an objective in recent years to increase the amount of data that can be stored on each disk, as well as the density at which the data is stored on the medium. This has necessitated an improvement not only in the magnetic medium itself, but also the techniques used in manufacturing the drive, as rigid mechanical tolerances must be maintained to ensure that the read/write heads maintain the proper spacings over the disks. A housing is typically provided to prevent attracting dust from the surrounding air. If dust is permitted to accumulate, the read/write head would have to fly farther from the disk, requiring the use of higher head flux densities and reducing the available storage densities. The dust on the surface would also cause excessive wear on the head and slider.

To increase the reliability of the high-density mass storage disk, the so-called "Winchester"-type disk drive was developed, in which the disks, the read/write heads and their actuating assemblies are all mounted in a housing assembly which is sealed to keep dust away from the disks. Filtered air may be directed over the annular disk surfaces to guard against the accumulation on the disks of any incidental dust which may seep into the housing. In prior art "Winchester"-type disk drives, as exemplified in U.S. Pat. No. 4,054,931 issued Oct. 18, 1977, the disk housing assembly comprises a metal base plate and a separate cover, of lightweight material such as plastic, which completes and seals the housing. A gasket may be used between the base and the cover to enhance the sealing. The base plate is usually larger than the cover, but the cover extends over the portion of the base plate necessary to enclose the disks and the head actuator.

The disk housing assembly is mounted in the disk drive cabinet, which includes a drive motor for rotating the disks, typically through a belt which cooperates with a disk spindle pulley projecting through the bottom of the housing. The drive also typically includes power supplies for driving the motor and drive control logic circuitry to facilitate reading and writing the data from and onto the disks.

The metal base plates of the prior art disk housings were susceptible to undesirable resonant vibrational modes which interfered with the heads accessing of the disks. To reduce these vibrations, heavy slab-like base plates were typically provided.

The size and weight of the base plate also served another purpose. In prior art disk housings the disk spindle, which supports and rotates the disks, is cantilevered on a duplex bearing mounted on the base plate. The rigid base plates provide the necessary support for the spindle against the vertical weight of the disks and the lateral pull of the drive belt as well as dynamic rigidity and adequate precision between the disk stack and the positioner, which contains the data and servo heads.

Furthermore, the larger weight of the prior art disk housings, typically weighing up to sixty pounds, required the cabinets containing the disk drives to be structurally enhanced to permit them to support the disk housings which added to the expense of the drives as a whole.

The invention disclosed herein provides a new and improved disk housing that is light in weight, low in manufacturing cost, and which provides the mechanical stiffness and structural rigidity needed for high density data storage and fast access time, without encountering objectionable resonances.

SUMMARY

It is therefore an object of the invention to provide a new and improved disk housing for use in a disk mass data storage facility for use in a data processing system.

It is a further object of the invention to provide a new and improved housing of the type described that is light in weight and low in manufacturing cost.

It is a further object to provide a new and improved disk housing that is light in weight, rigid, vibrationally stiff and capable of maintaining the close mechanical tolerances required for high density mass data storage.

In brief, the housing includes two substantially indentical cover members fitted together in an oyster shell or clam shell arrangement, with the disks enclosed therebetween. The disks are mounted on a spindle having end hubs projecting upwardly and downwardly therefrom. The ends of the spindle are received in two bearings, one of which is mounted in each of the upper and lower cover members. An actuator for moving read/write heads is situated in a housing extension which can be separately accessed for easy insertion and removal without requiring disassembly of the entire housing or separation of the upper and lower members.

BRIEF DESCRIPTION OF THE DRAWINGS

For a more complete description of the invention, and the objects and advantages thereof, reference should be had to the following detailed description of an illustrative embodiment, taken in conjunction with the drawings in which.

DETAILED DESCRIPTION OF AN ILLUSTRATIVE EMBODIMENT

As illustrated in FIGS. 1–5, the invention provides a housing 10 for an information storage medium such as disks generally indicated at 12, which can be accessed by read/write heads 14 driven by an actuating mechanism 15. The read/write heads 14 and the actuating mechanism 15 useful in one specific embodiment of the invention are the subject of U.S. Patent Applications, Ser. Nos. 126,129 and 126,020, filed on even date herewith and assigned to the assignee of the present application.

Figure 1:
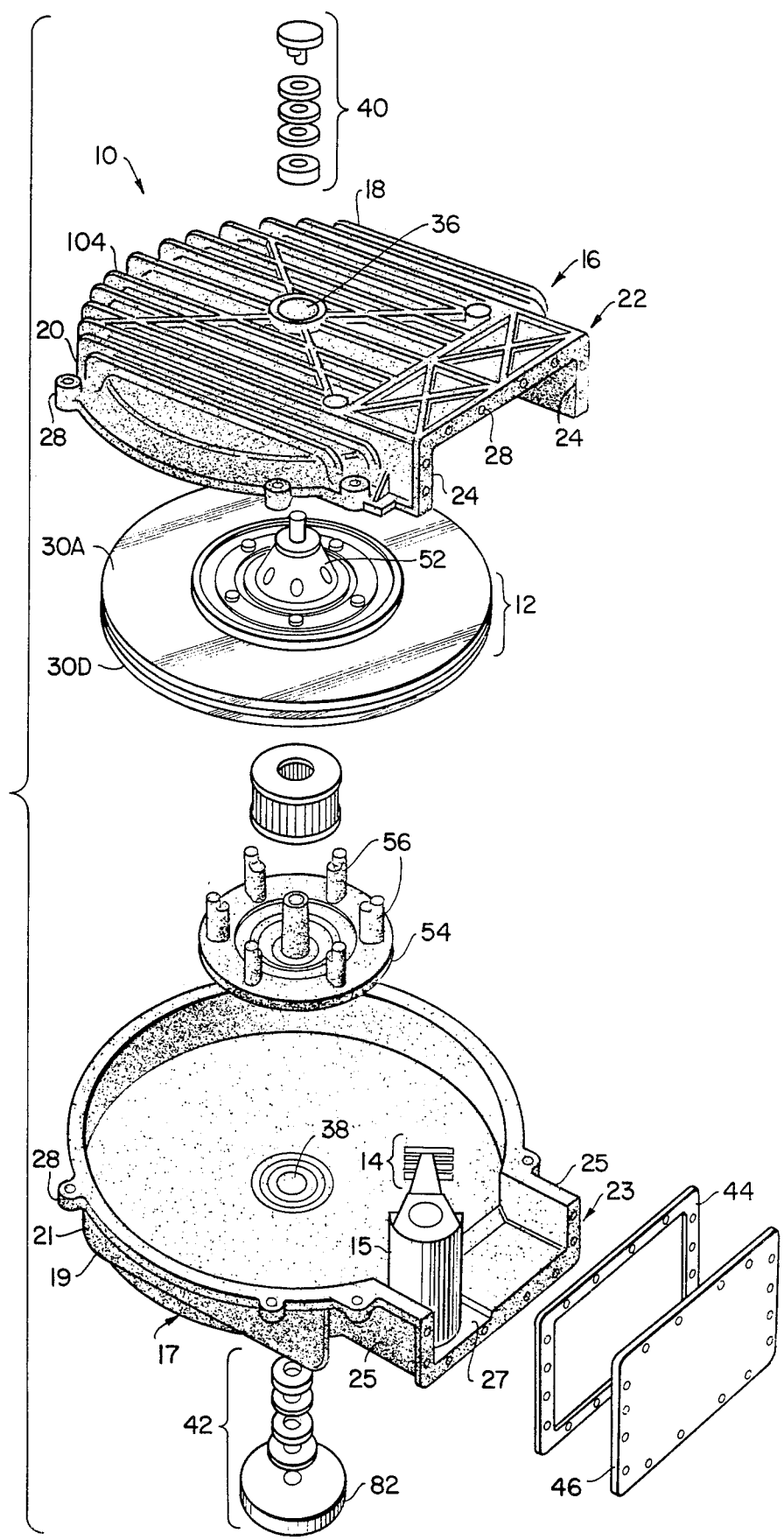
FIG. 1 is an exploded isometric view of a housing according to the invention, including the disks and read/write heads.

Housing 10 is generally shaped like an oyster shell or clam shell, and includes an upper member 16 and a lower member 17. Members 16 and 17 each include a substantially circular portion 18 and 19. Portions 18 and 19 include depending flanges 20 and 21 which mate to form a circular housing portion to accommodate disks 12. Members 16 and 17 further include extension members 22 and 23 which also include depending sidewalls 24 and 25, respectively, which mate to form an extension housing 26 to accommodate actuator 15. Extension housing 26 includes a support 27 for receiving actuator 15 formed in both members 22 and 23. The actuator is held in extension housing 26 from above and below by bolts (not shown) through holes 28. Support 27 is shown in FIG. 1 in member 23 only, and bolt holes 28 are shown in FIG. 1 in member 22 only. A plurality of mounts generally indicated at 29 extend from the mating flanges to accommodate bolts to fasten upper member 16 and lower member 17 together.

Figure 5:
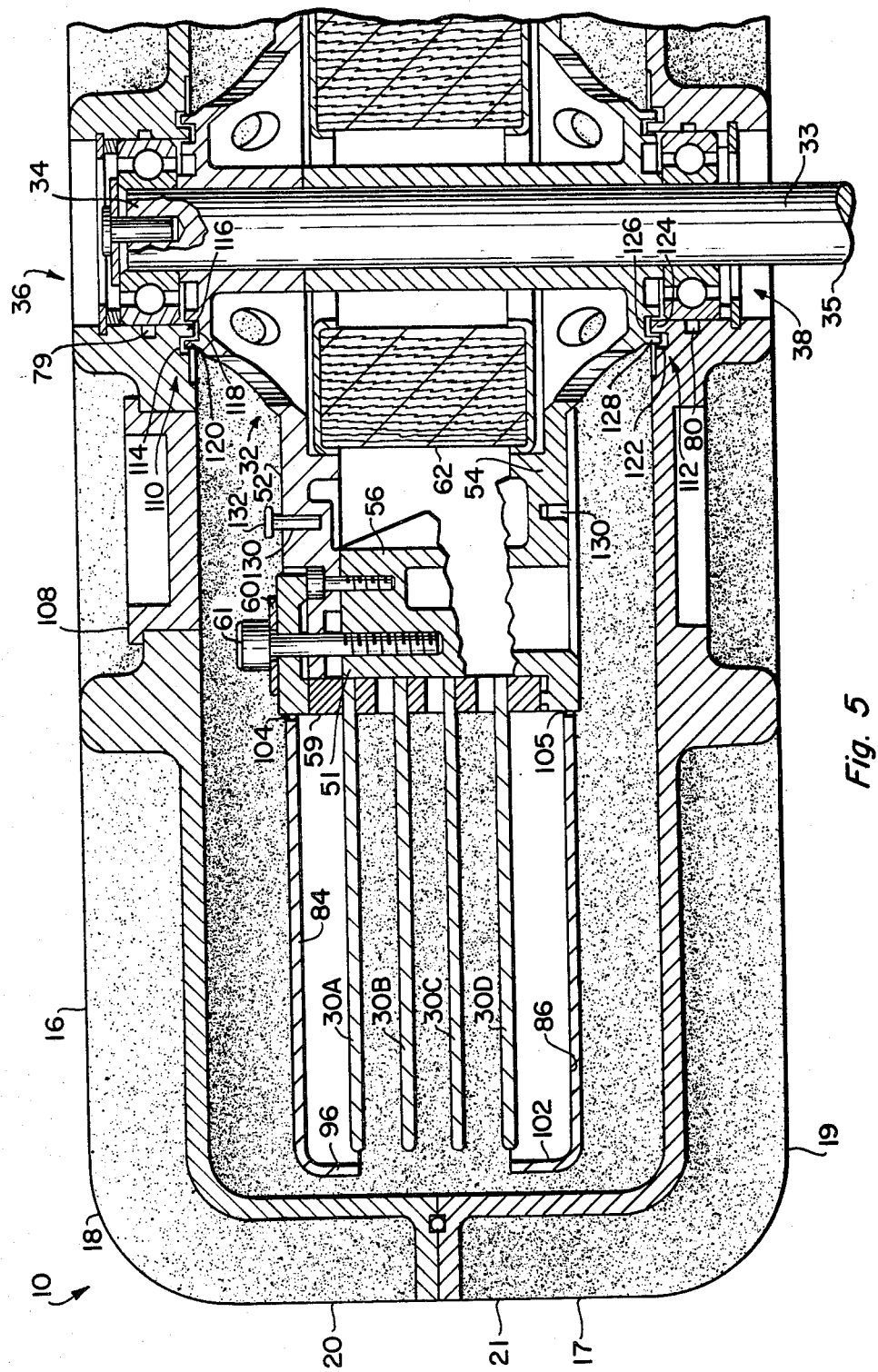
FIG. 5 is a side elevational sectional view showing a sectional detail of the structure for mounting the disks in the housing.

The disks 12 may typically include a pack of four annular members 30A–D joined together at a common hub 32. As best seen in FIG. 5, a spindle 33 extends through hub 32 and includes an upper end 34 and a lower end 35. The spindle may be press fit through the hub or secured by an adhesive (not shown).

The housing 10 further includes an upper aperture 36 in the center of circular portion 18 of member 16 and a lower aperture 38 in the center of circular portion 19 of member 17. The apertures accommodate bearing assemblies 40 and 42, which receive the upper end 34 and lower end 35, respectively, of spindle 33.

The extension housing 27 forms an opening 43 that is closed off by a gasket 44 and a cover plate 46.

Figure 2:
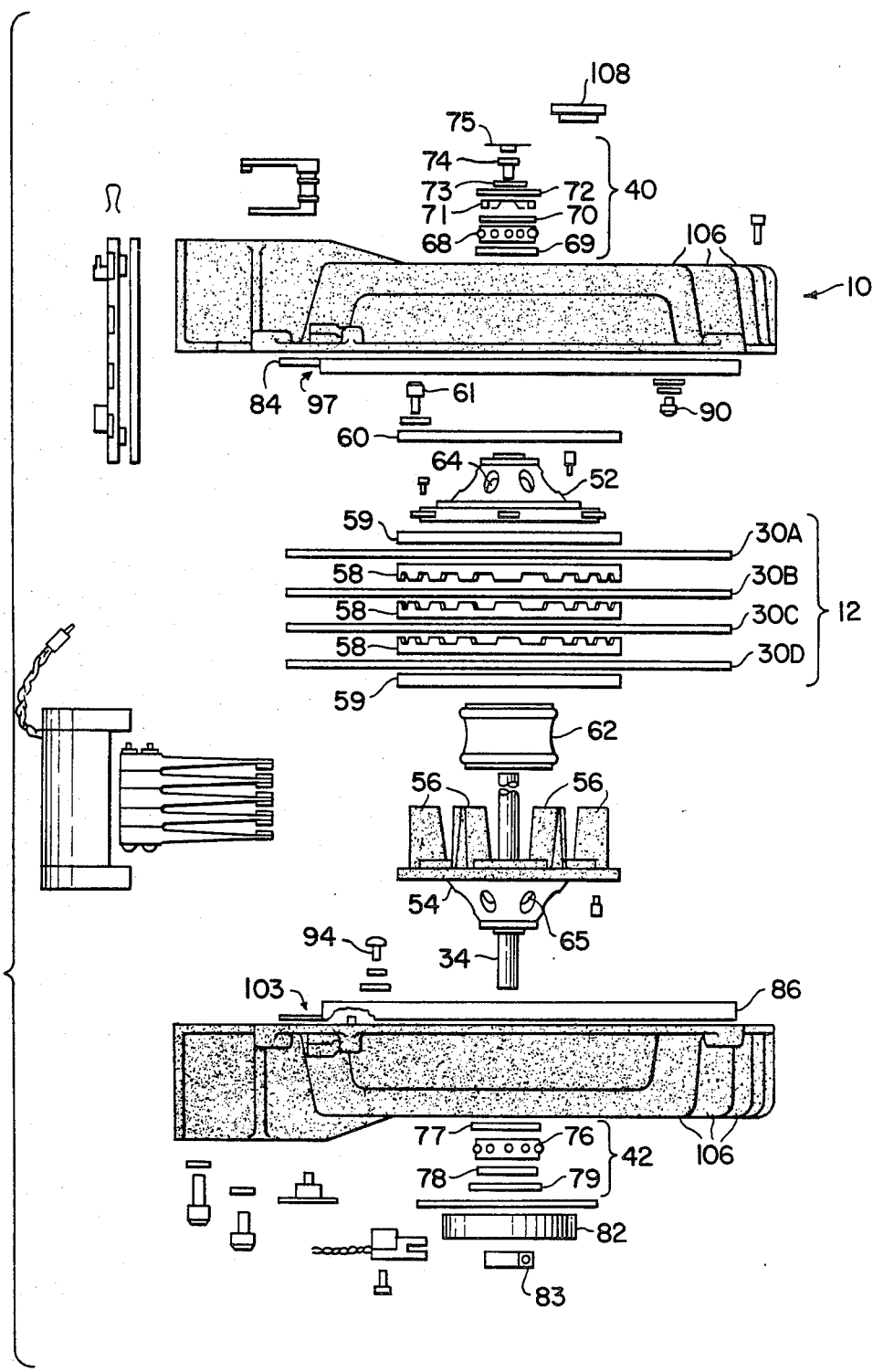
FIG. 2 is a side elevational view, exploded and in schematic form, of the disk housing shown in FIG. 1.

With particular reference to FIG. 2, the disk assembly includes four disks 30A–D, mounted on a circular hub assembly 32. Each of disks 30A–D is a conventional annular disk of, preferably, aluminum with a magnetizable medium coated on the upper and lower annular surfaces thereof. Each disk includes a central aperture 51 (shown in FIG. 5) to accommodate hub assembly 32.

With reference to FIGS. 2 and 5, hub 32 includes an upper cap 52 an a lower cap 54. Lower cap 54 has a plurality of arcuately spaced post members 56 extending upwardly therefrom which assist in keeping disks 30A–D in coaxial alignment and rigidly connecting the two caps together. Spacers 58 are provided between adjacent disks and spacers 59 are provided between upper cap 52 and lower cap 54 and the respective proximate disk 30A and 30D. Spacers 58 are provided with passageways 63 uniformly spaced about their peripheries, and caps 52 and 54 are provided with passageways 64 and 65 respectively. The passageways assist in establishing a circulating air flow across the annular disk surfaces as explained hereinafter. An annular clamp ring 60 retains the lower, depending rim 53 of upper cap 52 and is mounted by threaded fasteners 61 onto legs 56 to complete the disk and hub assembly. A cylindrical filter 62 is provided inside hub 32 and supported coaxially within the hub and spaced apart from spindle 33 to provide filtered air as described hereinafter. Hub assembly 32 can be easily disassembled to remove or replace any of disks 30A–D by simply removing the clamp ring 60 an fasteners 61.

Upper bearing assembly 40 includes a bearing 68, a spacer 70, an "O"-ring 69, a finger spring 71, a retaining ring 72, a bearing clamp 73, a ground screw 74, and a ground brush assembly 75. Lower bearing assembly 42 includes a bearing 76, an "O"-ring 78, a spacer 80 and a retaining ring 81. The "O" rings fit into grooves 77 and 79 (FIGS. 3 and 5), adjacent the outer rings of bearings 68 and 76 respectively, to inhibit the outer rings from rotating in the respective apertures 36 and 38.

A spindle pulley 82 is provided fixed to spindle 34 beneath bearing 42, attached to the spindle by a clamp 83. Spindle pulley 82 receives a belt (not shown) from the disk drive to rotate the disks 12.

Figure 3:
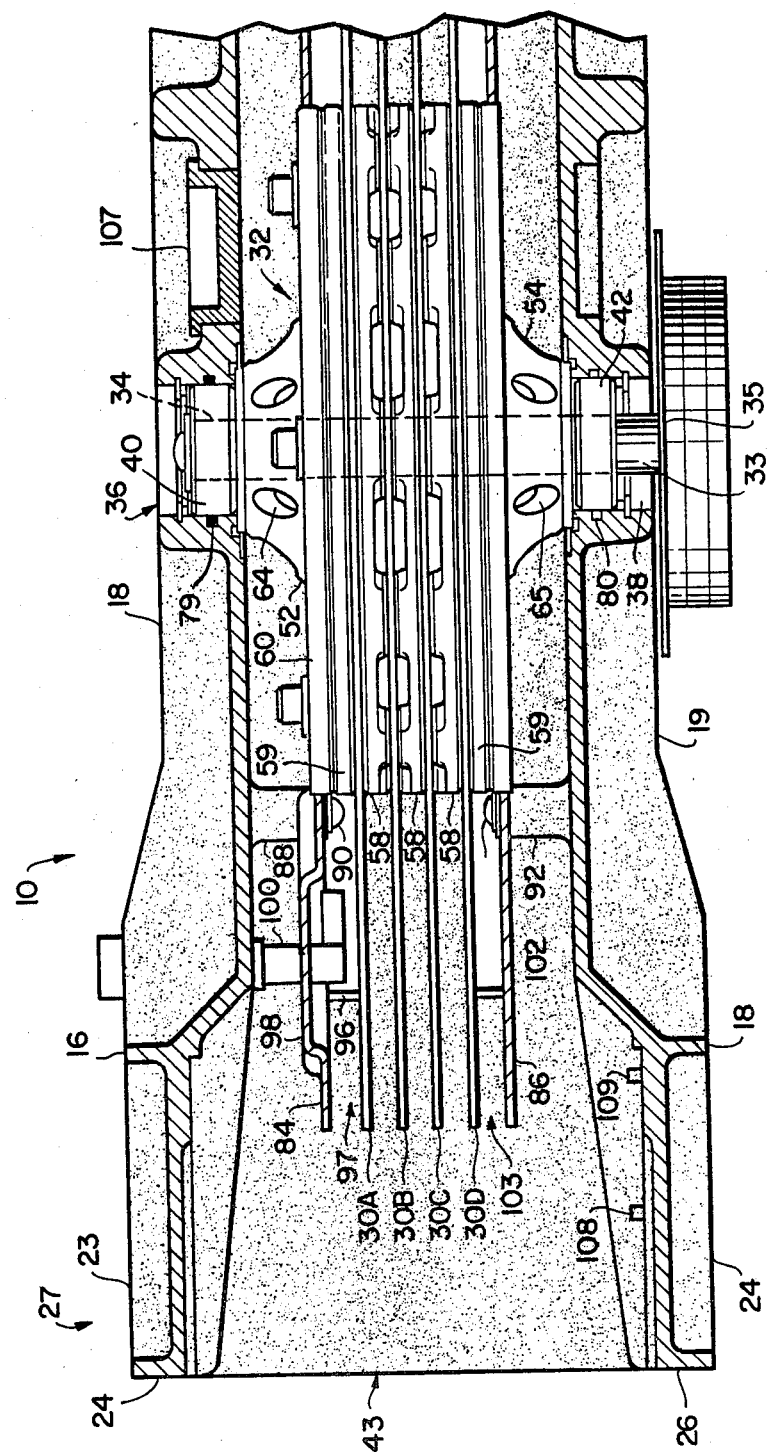
FIG. 3 is a side elevational view, partly in section, and partly broken off, showing a detail of a portion of the interior of the housing.
Figure 4:
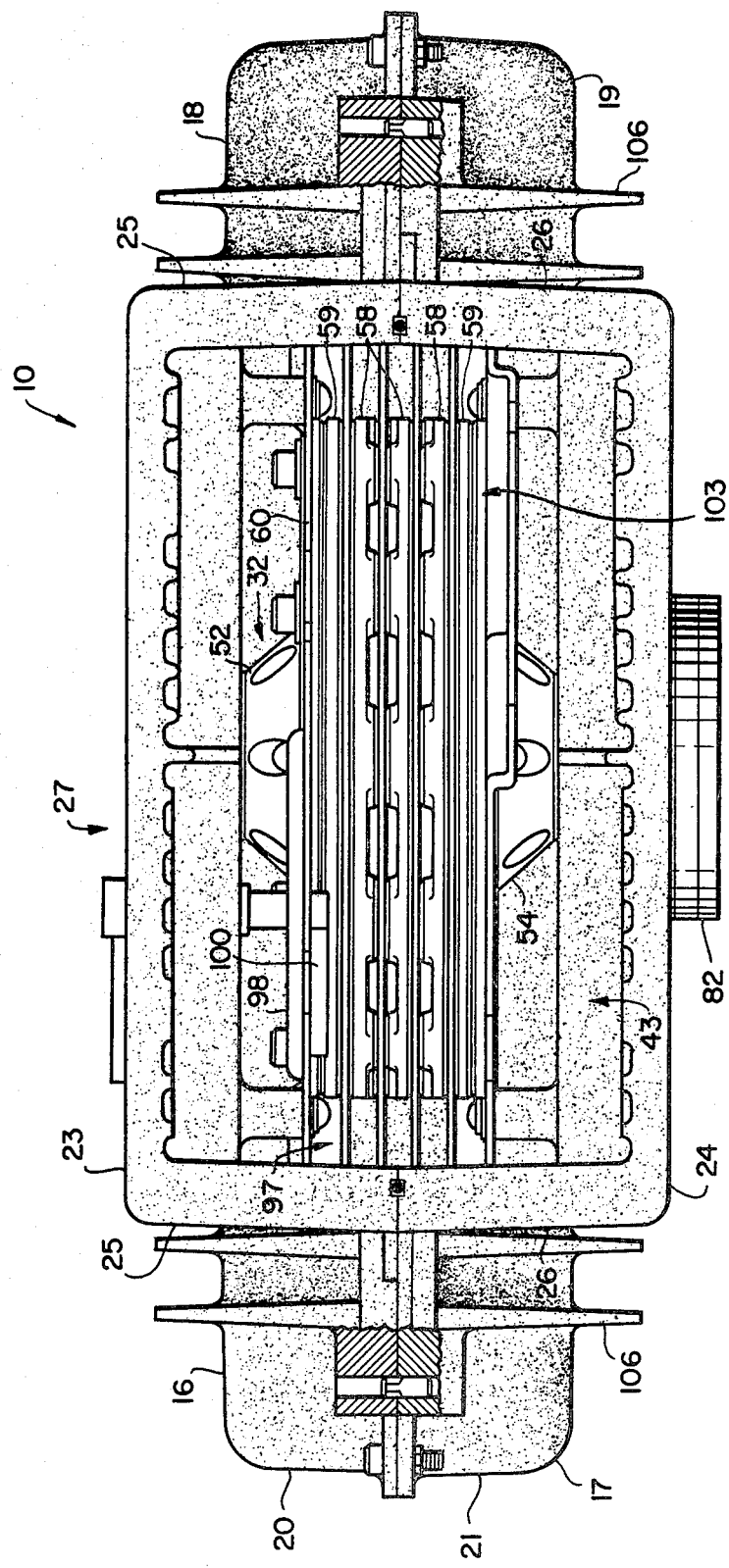
FIG. 4 is a rear elevational view of the housing and its interior, taken through the extension housing with its cover plate removed.

As illustrated in FIGS. 2–5, the housing 10 also includes an upper baffle 84 an a lower baffle 86 affixed to the inside of the housing above and below the disks 12 respectively. The baffles serve to restrict the air flow over the outer surfaces of disks 30A and 30D to substantially reduce temperature differentials among the surfaces of disks 30A–D. As illustrated in FIG. 3, upper member 16 of housing 10 includes a downwardly depending boss 88 to which upper baffle 84 is affixed by a bolt 90. Lower member 18 also includes a similar, upwardly extending boss 92, to which baffle 86 is mounted by a bolt 94. Additional bosses may also be provided for additional support for baffles 84 and 86.

As shown in FIGS. 3 and 5, upper plate 84 includes a flange 96 that depends downwardly from the rim thereof. As shown in FIGS. 2 and 3, flange 96 has an opening 97 proximate extension housing 27, to permit the read/write head to access the upper surface fo disk 30A. Baffle 84 may include an upwardly displaced portion 98 having a passageway (not shown) for receiving a sensor 100 for monitoring, for example, temperature of air flow at the outer surfaces of disk 30A.

Lower baffle 86 includes a flange 102 extending upwardly from the rim thereof similarly to flange 96. The flange 102 also has an opening 103 proximate extension housing 27 to permit the read/write heads to access the lower surface of lower disk 30D. Lower baffle 86 may also include a downwardly displaced portion 103 similar to portion 92, and a passageway therethrough, for receiving a sensor. The flanges preferably have a diameter slightly larger than the diameter of the disks and extend upwardly and downwardly, respectively, to the level of the proximate disks 30A and 30D respectively, as shown in FIG. 5.

The baffles also have a central apertures 104 and 105 to accommodate hub 32 and disks 12. The baffle peripheries defining apertures 104 and 105 should come as close as possible to hub 32 and disks 12 to prevent air from flowing through the apertures.

Figure 6:
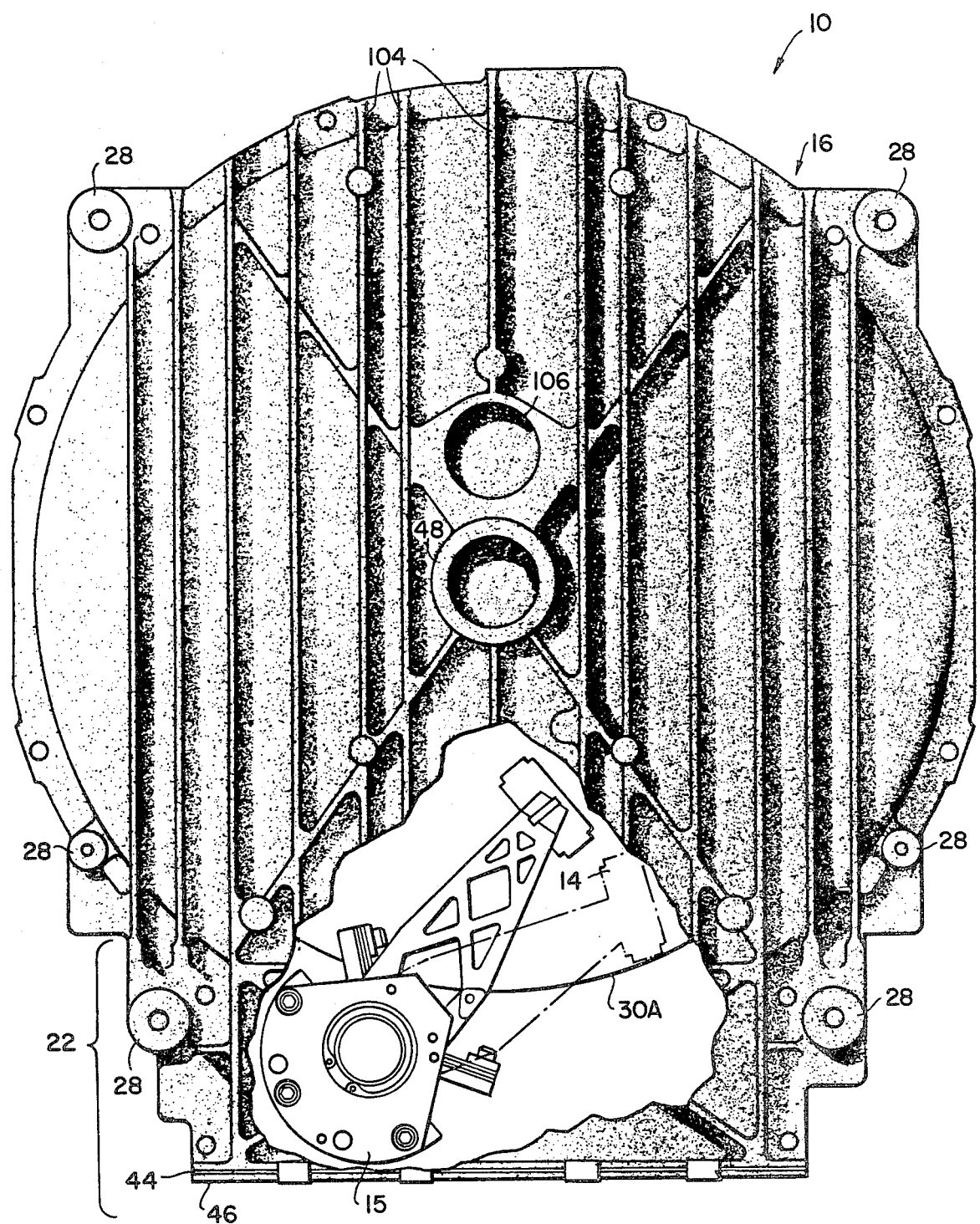
FIG. 6 is a top view of the housing, partially cut away showing the disk and positioner.

FIG. 6 is a top view of the housing assembly, partially cut away, showing the positioner and a head accessing a disk. The upper baffle 84 has also been cut away.

Housing 10 is preferably of cast aluminum which may then be machined as necessary. In the specific embodiment of FIGS. 1-6, the upper member and lower members are identically cast and then individually machined to provide the minor differences between the members necessary for, e.g., mounting sensors. This greatly reduces the amount of machining necessary for what was required in the prior art.

Fins 106 may be provided extending outwardly from circular portion 22 to dissipate heat and to enhance the housing's mechanical rigidity. A filter 107 may also be provided to permit filtered air to enter as explained below. The clamshell shape of housing 10, permits members 16 and 17 to provide support for each other, thereby eliminating the necessity of providing one very rigid base plate. The required mechanical rigidity is provided by forming members 16 and 17 from aluminum castings only 0.150 inches thick, so that the total weight of housing 10 (after machining) is only about 15.5 pounds, whereas prior art housings, with their massive base plates, as much as five times more.

Housing extension 26 includes a pair of dowel pins 108 (FIG. 3) and 109 extending upwardly from support 27 for aligning the actuator 15 with disks 30A-D. The actuator includes a radial groove in its bottom end cap. Pin 108 engages the groove and guides the actuator as it is being inserted. After it is inserted in all the way, the actuator pivots on pin 108 until it abuts pin 109. The bolts can then be threaded through holes 28 (FIG. 1) to hold the actuator in place. This arrangement securely holds the actuator in place parallel to the spindle.

Providing the spindle with a two-point bearing support, on opposite sides of the disks, one at upper member 16 and the other at lower member 17, greatly enhances the mechanical rigidity of the spindle structure, as compared to what was provided by prior art disk housings, wherein the spindle is cantilevered from a one-point bearing support located at the base plate. The enhanced rigidity of the spindle, in combination with the actuator being rigidly supported at both ends, parallel to the spindle permits the access times in housing 10 to be faster than could be obtained in prior art housings. Furthermore, the two-point bearing support in housing 10 permits the separate elements of housing 10 to have a lower thickness and mass than was required in the prior art, while providing greater rigidity and stiffness to the overall structure, thereby avoiding unwanted resonances and providing superior positioning accuracy and performance at a much reduced manufacturing cost an operating overhead.

As mentioned above in connection with FIGS. 2-5, spacers 58 are provided with several passageways 63; and caps 52 and 54 are provided with passageways 64 and 65, respectively. These passageways permit air to circulate in the housing 10 without the need for an additional pump. The air flows outwardly from the inside of the hub 32, around leg members 56, out passageways 63, and radially outward across the surfaces of the disks 30A-D. The air flows across the annular surfaces of the rapidly spinning disks, thereby providing dust removal and cooling. The air between the disks becomes entrained therewith, and therefore flows from the centers of the disks towards the peripheries. The air pressure at the peripheries of the disks is higher than the air pressure at their centers due to the effects of rotation. The air flow out passageways 63 from the inside of hub 32 draws a compensating air flow into the hub through passageways 64 and 65. The air enters the hub through passageways 64 and 65, flows through filter 62 inside hub 32 and out through passageways 63, and back across the surface of the disk to the inner wall of the housing 10. In a return path to the hub 32, the air flows from the inner wall of the housing 10 upwardly and downwardly around the inside surfaces of housing 10, to hub 32, again through passageways 64 and 65. This air is thus circulated without the need for separate pumps and without allowance for additional space in housing 10 to accommodate external filters.

Furthermore, since the filter 62 is situated within hub 32, the air is filtered immediately prior to flowing to the disks; in the prior art arrangements, by contrast, the filtering took place at a point removed from the disks and the air could pick up dust from the housing while it was being pumped from the filter to the disks. In the arrangement of the present invention, since the path from the filter to the disks is substantially reduced, there is a much lower possibility of the air picking up dust between the filter and the disks. Furthermore, the flow across the disk surfaces, since it emanates from the hub and proceeds to the disk rim without obstruction, is substantially less turbulent than the air flow in piror art housings, thereby reducing head buffetting.

Filter 107 is provided near bearing assembly 40 to facilitate air entering therethrough, particularly during start-up. The air pressure near caps 52 and 54 normally would be low, because of the air drawn through the passageways 64 and 65 by the spinning disks. If an opening with filter 107 had not been provided, unfiltered air would be drawn in through the bearings. However, with filter 107 provided, air passes through the filter into the housing, instead of through the bearings.

The housing also includes conventional labyrinth seals 110 and 112 (FIG. 5) between caps 52 and 54 and the respective housing member 16 and 17. Labyrinth seal 110 includes an annular groove 114 in member 16, defining a lip 116, and a groove 118 in cap 52 defining a lip 120. Lip 116 loosely glides in groove 118, and lip 120 glides in groove 114. Seal 112 includes a groove 122 in member 17 defining a lip 124, and a groove 126 in cap 54 defining a lip 128. Lip 124 loosely glides in groove 126, and lip 128 glides in groove 122. The labyrinth seals prevent air and dust from flowing through apertures 36 and 38 and bearing assemblies 40 and 42.

Hub 32 also includes holes 130 in the top and bottom caps 52 and 54 essentially equidistant from spindle 33 to accommodate balancing screws such as screw 132. Providing such holes in both caps 52 and 54 permits the disk pack to be balanced in two planes, both at the top and bottom of the disk pack, which makes possible greatly improved balancing over the single plane balancing in the prior art disk drives.

It should be noted that no passageways are provided to permit air to flow from inside hub 32 across the upper surface of upper disk 30A or the lower surface of lower disk 30D. Disks 30A and 30D and respective baffles 84 and 86 cooperate to provide air across the upper and lower surfaces of disks 30A and D, respectively. The combination of the stationary baffle 84 and the rapidly rotating disk 30A draws air through the opening 97 in flange 96, across the lower surface of disk 30A, and out through openings 97 again. A similar pumping action occurs with respect to stationary baffle 86 and lower disk 30D. The sizes of opening 97 and 103 therefore determine the amount of air flowing across the upper and lower surfaces of disks 30A and 30D.

As was also mentioned above, the rapidly spinning disks generate substantial amounts of heat. In prior art disk drives, the outer surfaces of disks 30A and 30D would be at a lower temperature than the other disk surfaces because the close confinement of the inner disks and lower air flow over their surfaces, limits the rate at which they dissipate their heat. Baffles 84 and 86, with their depending flanges, decrease air flow across the outer surfaces of disks 30A and 30D, thereby ensuring that all of the disk surfaces have a uniform operating temperature. The specific baffles and flanges herein have been used in one specific embodiment of the invention and are shown here by way of example; however, other flange diameters and heights may be required in specific instances. In the aforementioned specific embodiment, baffles 84 and 86 have been observed to reduce the temperature differential between the outer surfaces of disks 30A and 30D and the surfaces of inner disks 30B and 30C from about four degrees to less than one degree Fahrenheit.

Figure 7:
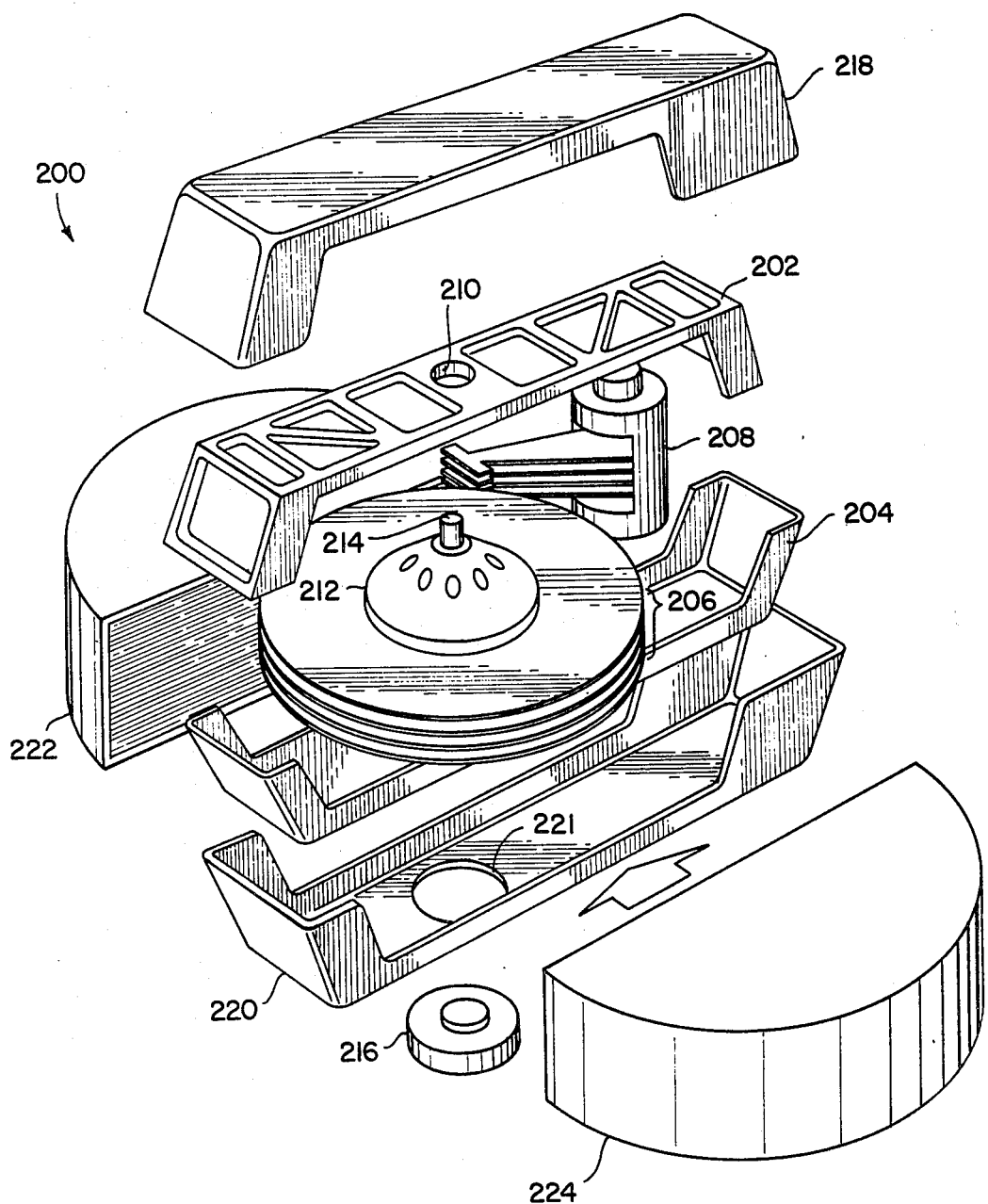
FIG. 7 is an exploded view of a second embodiment according to the invention.

FIG. 7 illustrates a second embodiment of the invention providing a rigid housing with a two point bearing support. Housing 200 includes two elongated rigid frame members 202 and 204 which form a loop frame for supporting a disk pack 206 and read/write heads and actuator assembly 208. Frame 202 includes an aperture 210 for receiving an upper bearing assembly. Frame member 204 includes a similar aperture (not shown) for receiving a lower bearing asembly (also not shown).

Disks 206 are similar to disks 12, including four disks, a hub 212, and a spindle including upper end 214 and a lower end (not shown). Upper spindle end 214 seats in a bearing assembly (not shown) mounted in aperture 210. A drive pulley 216 is affixed to the lower spindle end. Housing 200 also includes an upper cover 218 and a lower cover 220 to seal around frame members 202 and 204. Side covers 222 and 224 are provided to complete the housing. The spindle pulley 216 connects to the lower spindle through an aperture 221 in lower cover 220.

Disk pack 206 provided in housing 200 may be substantially identical to disk pack 12 in housing 10 including the spacers with the air flow passages, an annular filter seated inside of the hub and apertures in the hub to permit filtering of the air passing from the hub across the disk. Baffles (not shown) similar to baffles 84 and 86 may also be provided. Such baffles may be affixed to upper frame members 202 and 204 by means such as bosses and threaded fasteners. Frame members 202 and 204 provide housing 200 with a symmetrical mutual support, in the same manner that members 16 and 17 provide mutual support for housing 10. Side covers 222 and 224 may be plastic, and may be clear to permit the disks and actuator to be viewed.

It should be noted that any number of disks may be provided in the disk pack 12. Four disks 30A-D have been shown for illustrative purpose only.

It will thus be seen that the foregoing objects set forth above, among those made apparent in the preceeding description, are efficiently attained. The invention provides a new and improved housing assembly for magnetic disks used in a mass information storage unit that is light in weight and inexpensive to manufacture but very stiff mechanically. Since certain changes may be made in the above illustrative embodiment without departing from the scope of the claims, it is intended that all matter named in the above description and shown in the accompanying drawings be interpreted as illustrative and not in a limiting sense.

What is claimed as new and desired to be secured by Letters Patent of the United States is:

1. A housing assembly for housing a disk for use in a mass information storage apparatus, the disk being supported on a spindle having first and second ends, said housing assembly comprising:
   A. first and second housing members each including
      (i) a first and second generally circular portion having a rim,
      (ii) first and second generally rectangular extension means each generally coplanar with a respective one of said circular portions defining an extension housing and having an edge, and
      (iii) flange means depending from at least a substantial continuous portion of said rim and from the portions of said edge of said extension means adjacent to said circular portions, the distal edges of said extension means being free, and the distal edges and said flange means forming an opening in said housing assembly, said flange means further having mating surfaces,
   B. means for coupling together said mating surfaces of said flanges, to rotatably support the disk on the spindle inside of said housing assembly, and
   C. removable cover means for sealing the opening defined by said extension housing means, thereby to seal the interior of said housing assembly from contaminants outside said housing assembly.

2. A housing assembly as defined in claim 1 wherein each of said supporting means is situated in the center of its respective circular portion.

3. A housing assembly as defined in claim 2 wherein said supporting means comprises means defining an aperture in the center of each circular portion, and bearing means supported by each said aperture defining means, each bearing means rotatably supporting one end of the spindle.

4. A housing assembly as defined in claim 1 in which said extension means includes means for receiving a read/write head and actuator therefor, each of said rectangular portions including means for supporting and securing an end of said actuator.

5. A housing assembly as defined in claim 1 wherein said circular portions further include fins extending outwardly therefrom to dissipate heat.

* * * * *